United States Patent
Ivakitch et al.

(10) Patent No.: US 12,152,491 B1
(45) Date of Patent: Nov. 26, 2024

(54) RIBBED SEAL ELEMENT FOR AIRCRAFT POWERPLANT

(71) Applicant: Pratt & Whitney Canada Corp., Longueuil (CA)

(72) Inventors: Richard Ivakitch, Scarborough (CA); James O Brien, Hamilton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/590,001

(22) Filed: Feb. 28, 2024

(51) Int. Cl.
*F01D 11/00* (2006.01)

(52) U.S. Cl.
CPC .......... *F01D 11/00* (2013.01); *F05D 2240/55* (2013.01)

(58) Field of Classification Search
CPC ...... F01D 11/00; F01D 25/24; F05D 2240/55; F04D 29/70; F04D 29/522
See application file for complete search history.

(56) References Cited

U.S. PATENT DOCUMENTS

| | | | |
|---|---|---|---|
| 2,835,342 A * | 5/1958 | Hockert | F02C 7/055 |
| | | | 55/306 |
| 2,931,460 A | 4/1960 | Alexander | |
| 4,634,132 A | 1/1987 | Jelinek | |
| 7,634,984 B2 | 12/2009 | Stelzer | |
| 8,523,188 B2 | 9/2013 | Zaugg | |
| 9,169,930 B2 | 10/2015 | Panchal | |
| 9,605,596 B2 | 3/2017 | Lefevre | |
| 9,670,791 B2 | 6/2017 | Broomer | |
| 10,167,730 B2 * | 1/2019 | Davis | F16J 15/0887 |
| 10,273,881 B2 | 4/2019 | Dornier | |
| 10,364,746 B2 * | 7/2019 | Srinivasan | F01D 25/24 |
| 10,513,980 B2 | 12/2019 | Kyritsis | |
| 10,578,026 B2 | 3/2020 | Lefevre | |
| 11,021,983 B2 * | 6/2021 | Davis | F01D 25/246 |
| 11,143,303 B2 | 10/2021 | Bifulco | |
| 11,480,249 B2 * | 10/2022 | Doman | F16J 15/06 |
| 2013/0283817 A1 * | 10/2013 | Flanagan | F01D 9/023 |
| | | | 60/800 |
| 2016/0090853 A1 * | 3/2016 | Lutjen | F16J 15/0887 |
| | | | 415/173.1 |
| 2020/0286694 A1 | 9/2020 | Motoki | |

FOREIGN PATENT DOCUMENTS

| | | |
|---|---|---|
| CN | 204436595 U | 7/2015 |
| GB | 757724 A | 9/1956 |

* cited by examiner

*Primary Examiner* — Eldon T Brockman
(74) *Attorney, Agent, or Firm* — Getz Balich LLC (57) ABSTRACT

An assembly for an aircraft powerplant includes a first component, a second component, an annular seal element and a third component. The first component includes a first land surface which extends axially along and circumferentially about an axis. The second component includes a second land surface radially opposite the first land surface. The second land surface extends axially along and circumferentially about the axis. The annular seal element extends radially between a first side and a second side. The annular seal element includes a base, a plurality of ribs and a groove. The base includes a seal element surface disposed at the first side that radially engages the first land surface. The ribs are disposed at the second side. Each rib projects out from the base and radially engages the second land surface. The groove projects partially axially into the base. The third component projects axially into the groove.

20 Claims, 7 Drawing Sheets

RIBBED SEAL ELEMENT FOR AIRCRAFT POWERPLANT

TECHNICAL FIELD

This disclosure relates generally to an aircraft powerplant and, more particularly, to a seal element for the aircraft powerplant.

BACKGROUND INFORMATION

A gas turbine engine may include an inlet guard screen at an inlet into the gas turbine engine. This guard screen may prevent or reduce ingestion of foreign object debris into the gas turbine engine. Such a guard screen may be paired with a seal element. While known guard screen arrangements and associated seals have various advantages, there is still room in the art for improvement.

SUMMARY

According to an aspect of the present disclosure, an assembly is provided for an aircraft powerplant. This assembly includes a first component, a second component, an annular seal element and a third component. The first component includes a first land surface. The first land surface extends axially along and circumferentially about an axis. The second component includes a second land surface radially opposite the first land surface. The second land surface extends axially along and circumferentially about the axis. The annular seal element is configured from or otherwise includes a polymer material. The annular seal element extends radially between a first side and a second side. The annular seal element includes a base, a plurality of ribs and a groove. The base includes a seal element surface disposed at the first side that radially engages the first land surface. The ribs are disposed at the second side. Each of the ribs projects out from the base and radially engages the second land surface. The groove projects partially axially into the base. The third component projects axially into the groove.

According to another aspect of the present disclosure, another assembly is provided for an aircraft powerplant. This assembly includes an inlet case, an inlet duct, a polymer seal element and an inlet screen. The inlet case includes an inlet case wall with a case land surface. The inlet duct circumscribes the inlet case. The inlet duct includes an inlet duct wall with a duct land surface. The polymer seal element is arranged radially between the case land surface and the duct land surface. The polymer seal element includes a base and a plurality of ribs. The base sealingly engages the case land surface. Each of the ribs projects out from the base and sealing engages the duct land surface. The inlet screen is mounted with the inlet case and the inlet duct through the polymer seal element.

According to another aspect of the present disclosure, another assembly is provided for an aircraft powerplant. This assembly includes an inlet case, an inlet duct, a compliant seal element and an inlet screen. The inlet case includes an inlet case wall with a case land surface. The inlet duct circumscribes the inlet case. The inlet duct includes an inlet duct wall with a duct land surface radially opposite the case land surface. The compliant seal element is arranged radially between the case land surface and the duct land surface. The compliant seal element includes a cylindrical surface, a plurality of ribs and a groove. The cylindrical surface scalingly engages the case land surface. Each of the ribs sealingly engages the duct land surface. The inlet screen projects into the groove. The compliant seal element forms a seal between the inlet case wall, the inlet duct wall and the inlet screen.

The third component may be mounted with the first component and the second component through the annular seal element.

The annular seal element may extend circumferentially about the axis. The third component may extend circumferentially about the axis.

The assembly may also include a second annular seal element, and the second annular seal element may include a second base, a plurality of second ribs and a second groove. The second base may include a second seal element surface that radially engages another first land surface of the first component. Each of the second ribs may project out from the second base and radially engage another second land surface of the second component. The second groove may project partially axially into the second base. The third component may project axially into the second groove.

The third component may be configured as or otherwise include an inlet screen for the aircraft powerplant.

The first land surface may circumscribe the second land surface.

The second land surface may circumscribe the first land surface.

The first land surface may have a cylindrical geometry at least where the seal element surface radially engages the first land surface.

The second land surface may have a cylindrical geometry at least where the ribs radially engage the second land surface.

Each of the ribs may be an annular rib.

The ribs may include a first rib. The first rib may project out from the base along a trajectory to a distal end of the first rib. The trajectory may be perpendicular to the axis at least prior to radial engagement with the second land surface.

The ribs may include a first rib. The first rib may project out from the base along a trajectory to a distal end of the first rib. The trajectory may be angularly offset from the axis by an acute angle towards the groove.

The ribs may include a first rib. The first rib may project out from the base along a trajectory to a distal end of the first rib. The trajectory may be angularly offset from the axis by an acute angle away from the groove.

The ribs may include a first rib. The first rib may project out from the base along a trajectory to a distal end of the first rib. The trajectory may be a straight line trajectory at least prior to radial engagement with the second land surface.

The ribs may include a first rib. The first rib may project out from the base along a trajectory to a distal end of the first rib. The first rib may have a lateral width that is constant along a majority of the trajectory between the base and the distal end.

The ribs may include a first rib. The first rib may have a lateral width that decreases as the first rib projects out from the base to a distal end of the first rib.

The ribs may include a first rib with a bulbous sectional geometry.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
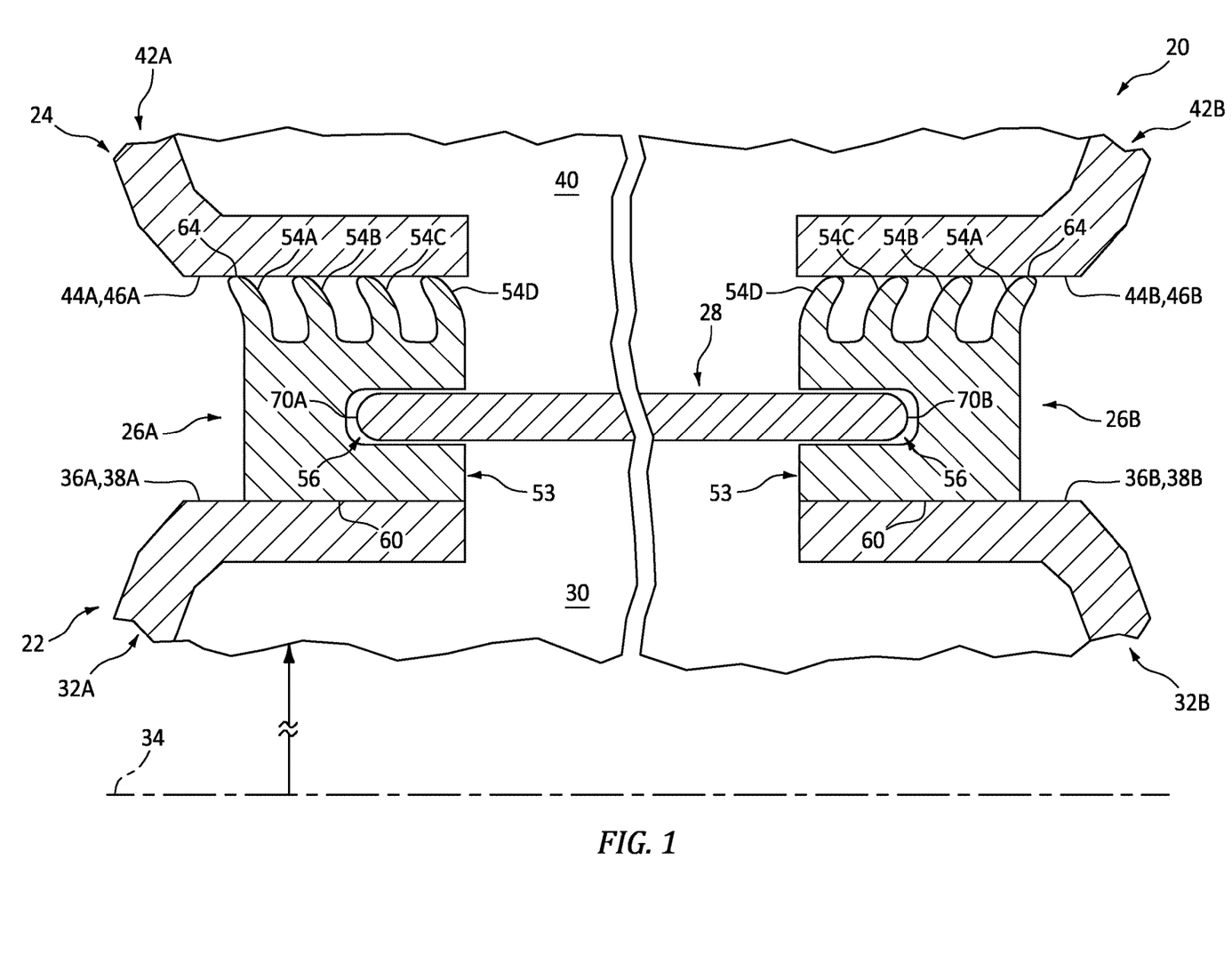
FIG. 1 is a partial sectional illustration of an inlet assembly for an aircraft powerplant.

FIG. 1 illustrates an airflow inlet assembly 20 for a powerplant of an aircraft. The aircraft may be an airplane, a helicopter, a drone (e.g., an unmanned aerial vehicle (UAV)) or any other manned or unmanned aerial vehicle or system. The aircraft powerplant may be configured as or otherwise include a gas turbine engine such as a turboshaft engine, a turboprop engine or an auxiliary power unit (APU). The inlet assembly 20 of FIG. 1 includes an inner inlet case 22, an outer inlet duct 24, one or more seal elements 26A and 26B (generally referred to as "26") and an inlet screen 28. Note, while the inlet screen 28 is schematically shown in the drawings as a solid body for ease of illustration, it should be recognized the inlet screen 28 is actually a porous body as described below which allows airflow thereacross.

The inlet case 22 includes an inlet port 30 and one or more inlet case walls 32A and 32B (generally referred to as "32"). The inlet port 30 extends axially along an axis 34 between the first case wall 32A and the second case wall 32B. Briefly, the axis 34 may be a centerline axis of the aircraft powerplant (e.g., the gas turbine engine), the inlet assembly 20 and/or one or more of the inlet assembly members 22, 24, 26A, 26B and/or 28. The axis 34 may also or alternatively be a rotational axis of one or more rotating components, structures and/or assemblies within and/or operatively coupled to the aircraft powerplant (e.g., the gas turbine engine). The inlet port 30 projects radially into the inlet case 22 from radial outer distal ends 36A and 36B (generally referred to as "36") of the case walls 32. The inlet port 30 extends within the inlet case 22 circumferentially about (e.g., completely around) the axis 34 providing the inlet port 30 with, for example, a full-hoop annular geometry.

The first case wall 32A projects radially outward (e.g., away from the axis 34) to its first case wall end 36A. The first case wall 32A extends circumferentially about (e.g., completely around) the axis 34 providing the first case wall 32A with, for example, a full-hoop annular geometry. The first case wall 32A extends along and forms a first axial peripheral boundary of the inlet port 30. The first case wall 32A includes a first case land surface 38A disposed at (e.g., on, adjacent or proximate) the first case wall end 36A. This first case land surface 38A extends axially along the axis 34 between opposing axial ends of the first case land surface 38A. The first case land surface 38A extends circumferentially about (e.g., completely around) the axis 34 providing the first case land surface 38A with, for example, a full-hoop tubular geometry. Here, the first case land surface 38A has a regular cylindrical geometry. A radius from the axis 34 to the first case land surface 38A, for example, is uniform (e.g., constant, the same) as the first case land surface 38A extends axially along the axis 34 between its opposing first case land surface ends. The present disclosure, however, is not limited to such an exemplary first case land surface arrangement.

The second case wall 32B projects radially outward (e.g., away from the axis 34) to its second case wall end 36B. The second case wall 32B extends circumferentially about (e.g., completely around) the axis 34 providing the second case wall 32B with, for example, a full-hoop annular geometry. The second case wall 32B extends along and forms a second axial peripheral boundary of the inlet port 30. The second case wall 32B includes a second case land surface 38B disposed at the second case wall end 36B. This second case land surface 38B extends axially along the axis 34 between opposing axial ends of the second case land surface 38B. The second case land surface 38B extends circumferentially about (e.g., completely around) the axis 34 providing the second case land surface 38B with, for example, a full-hoop tubular geometry. Here, the second case land surface 38B has a regular cylindrical geometry. A radius from the axis 34 to the second case land surface 38B, for example, is uniform as the second case land surface 38B extends axially along the axis 34 between its opposing second case land surface ends. The present disclosure, however, is not limited to such an exemplary second case land surface arrangement.

The inlet case 22 and its case walls 32 may be partially or completely formed from a relatively stiff material. The inlet case 22 and its case walls 32, for example, may be formed from metal; e.g., a pure metal or an alloy. Alternatively, the inlet case 22 and its case walls 32 may be formed from a stiff non-metal such as, but not limited to, a composite material or a ceramic material.

The inlet duct 24 includes an inlet flowpath 40 and one or more inlet duct walls 42A and 42B (generally referred to as "42"). The inlet flowpath 40 extends axially along the axis 34 between the first duct wall 42A and the second duct wall 42B. The inlet flowpath 40 projects radially into the inlet duct 24 from radial inner distal ends 44A and 44B (generally referred to as "44") of the duct walls 42. The inlet flowpath 40 extends within the inlet duct 24 circumferentially about (e.g., completely around) the axis 34 providing the inlet flowpath 40 with, for example, a full-hoop annular geometry. This inlet flowpath 40 is fluidly coupled with the inlet port 30 through the inlet screen 28.

The first duct wall 42A projects radially inward (e.g., towards the axis 34) to its first duct wall end 44A. The first duct wall 42A extends circumferentially about (e.g., completely around) the axis 34 providing the first duct wall 42A with, for example, a full-hoop annular geometry. The first duct wall 42A extends along and forms a first axial peripheral boundary of the inlet flowpath 40. The first duct wall 42A includes a first duct land surface 46A disposed at the first duct wall end 44A. This first duct land surface 46A extends axially along the axis 34 between opposing axial ends of the first duct land surface 46A. The first duct land surface 46A extends circumferentially about (e.g., completely around) the axis 34 providing the first duct land surface 46A with, for example, a full-hoop tubular geometry. Here, the first duct land surface 46A has a regular cylindrical geometry. A radius from the axis 34 to the first duct land surface 46A, for example, is uniform as the first duct land surface 46A extends axially along the axis 34 between its opposing first duct land surface ends. The present disclosure, however, is not limited to such an exemplary first duct land surface arrangement.

The second duct wall 42B projects radially inward (e.g., towards the axis 34) to its second duct wall end 44B. The second duct wall 42B extends circumferentially about (e.g., completely around) the axis 34 providing the second duct wall 42B with, for example, a full-hoop annular geometry. The second duct wall 42B extends along and forms a second axial peripheral boundary of the inlet flowpath 40. The second duct wall 42B includes a second duct land surface 46B disposed at the second duct wall end 44B. This second duct land surface 46B extends axially along the axis 34 between opposing axial ends of the second duct land surface 46B. The second duct land surface 46B extends circumferentially about (e.g., completely around) the axis 34 providing the second duct land surface 46B with, for example, a full-hoop tubular geometry. Here, the second duct land surface 46B has a regular cylindrical geometry. A radius from the axis 34 to the second duct land surface 46B, for example, is uniform as the second duct land surface 46B extends axially along the axis 34 between its opposing second duct land surface ends. The present disclosure, however, is not limited to such an exemplary second duct land surface arrangement.

The inlet duct 24 and its duct walls 42 may be partially or completely formed from a relatively stiff material. The inlet duct 24 and its duct walls 42, for example, may be formed from metal; e.g., a pure metal or an alloy. Alternatively, the inlet duct 24 and its duct walls 42 may be formed from a stiff non-metal such as, but not limited to, a composite material or a ceramic material.

Figure 2:
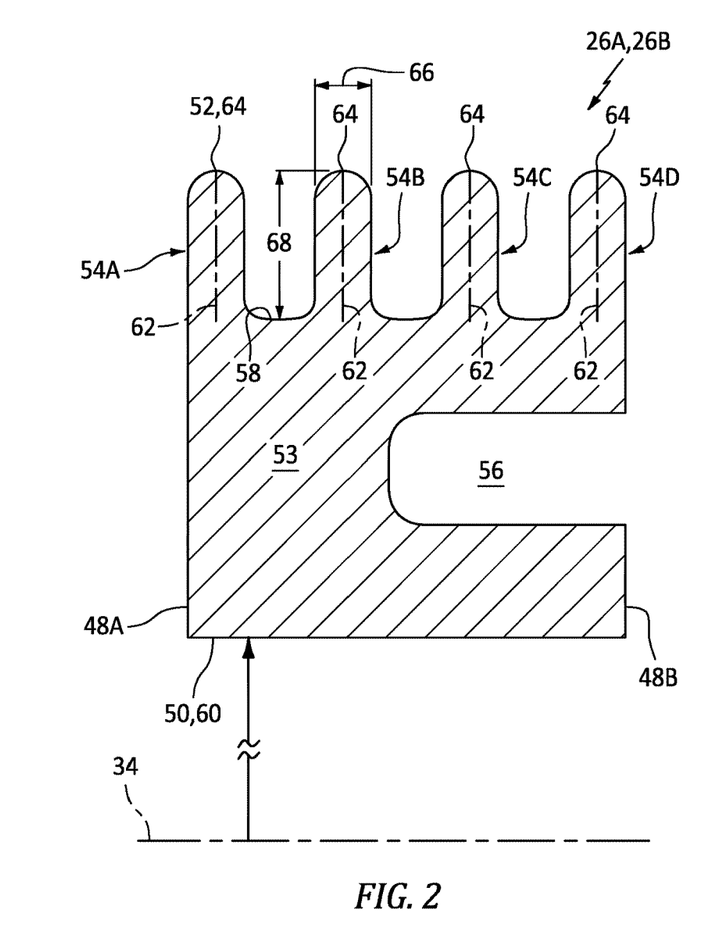
FIG. 2 is a partial sectional illustration of a seal element.

Referring to FIG. 2, each seal element 26 extends axially along the axis 34 between opposing axial sides 48A and 48B (generally referred to as "48") of the respective seal element 26. Each seal element 26 extends radially from a radial inner side 50 of the respective seal element 26 to a radial outer side 52 of the respective seal element 26. Each seal element 26 extends circumferentially about (e.g., completely around) the axis 34 providing that seal element 26 with, for example, a full-hoop annular geometry. Each seal element 26 of FIG. 2 includes an element base 53, one or more element ribs 54A-D (generally referred to as "54") and an element groove 56.

The element base 53 extends axially along the axis 34 between and to the opposing seal element sides 48A and 48B. The element base 53 extends radially from the seal element inner side 50 to a radial outer side 58 of the element base 53. The element base 53 extends circumferentially about (e.g., completely around) the axis 34 providing the element base 53 with, for example, a full-hoop annular geometry. The element base 53 includes a seal element surface 60 disposed at the seal element inner side 50. This seal element surface 60 extends axially along the axis 34 between the opposing seal element sides 48A and 48B. The seal element surface 60 extends circumferentially about (e.g., completely around) the axis 34 providing the seal element surface 60 with, for example, a full-hoop tubular geometry. Here, the seal element surface 60 has a regular cylindrical geometry. A radius from the axis 34 to the seal element surface 60, for example, is uniform as the seal element surface 60 extends axially along the axis 34 between its opposing seal element sides 48A and 48B. The present disclosure, however, is not limited to such an exemplary seal element surface arrangement.

The element ribs 54 are connected to (e.g., formed integral with or otherwise attached to) the element base 53 at the base outer side 58. The element ribs 54 of FIG. 2 are arranged (e.g., equispaced) axially along the element base 53 between the opposing seal element sides 48A and 48B. Each end element rib 54A, 54D of FIG. 2, for example, is disposed at a respective one of the opposing seal element sides 48A and 48B. Each intermediate element rib 54B, 54C of FIG. 2 is disposed axially between the end elements ribs 54A and 54D. With this arrangement, each axially neighboring (e.g., adjacent) pair of the elements ribs 54 forms sides of and are axially spaced by an inter-rib channel; e.g., an annular channel.

Each of the element ribs 54 projects (e.g., radially) along a spanwise trajectory 62 of the respective element rib 54 from the element base 53 at its base outer side 58 to an outer distal end 64 (e.g., a tip) of the respective element rib 54. At least prior to (e.g., and following) assembly of the seal element 26 with the other inlet assembly members 22, 24 and 28, each rib distal end 64 is located at the seal element outer side 50. Each of the element ribs 54 extends laterally (e.g., axially along the axis 34) between opposing lateral sides of the respective element rib 54. Here, a (e.g., maximum or average) lateral width 66 of each element rib 54 is sized less than a (e.g., maximum or average) spanwise height 68 of the respective element rib 54. The rib spanwise height 68, for example, may be two times ($2x$), three times ($3x$), four times ($4x$) or more than the rib lateral width 66; but, generally less than ten times ($10x$) the rib lateral width 66 for example. A dimensional relationship between the rib spanwise height 68 and the rib lateral width 66, however, may vary depending on, for example, flexibility of material forming the respective element rib 54 and/or inlet assembly requirements. Each of the element ribs 54 extends circumferentially about (e.g., completely around) the axis 34 providing that respective element rib 54 with, for example, a full-hoop annular geometry. Here, each of the element ribs 54 of FIG. 2 circumscribes the element base 53.

The element groove 56 is disposed in the element base 53 at a respective side 48B of the seal element 26. The element groove 56 of FIG. 2, for example, projects axially along the axis 34 partially into the element base 53 from the seal element lateral side 48B to a distal end of the element groove 56. This element groove 56 is located at an intermediate location (e.g., centered) between the seal element inner side 50 and the element base outer side 58. The element groove 56 extends circumferentially about (e.g., completely around) the axis 34 within the seal element 26 and its element base 53 providing the element groove 56 with, for example, a full-hoop annular geometry.

Each seal element 26 and its members 53 and 54 may be partially or completely formed from a relatively compliant material; e.g., a flexible material, a resilient material, etc. Each seal element 26 and its members 53 and 54, for example, may be formed (e.g., as a monolithic body) from a polymer such as, but not limited to, silicon, rubber, ethylene vinyl acetate (EVA), neoprene or the like. The seal element material may be non-porous or porous. Where the seal element material is porous, the seal element material may be an open cell foam or a closed cell foam. Alternatively, the seal element members 53 and 54 may be partially or completely formed from different materials. For example, the element base 53 may be formed from an elastomer with a relatively high durometer value; e.g., a relatively hard elastomer. Each of the element ribs 54, on the other hand, may be formed from an elastomer with a relatively low durometer value; e.g., a relatively soft elastomer. To form the element ribs 54 with the element base 53, the softer elastomer may be over-molded onto the harder elastomer. The present disclosure, however, is not limited to such an exemplary manufacturing technique.

Referring to FIG. 1, during assembly of the first seal element 26A with the inlet case 22 and the inlet duct 24, the first seal element 26A is arranged between and is radially engaged with the first case wall 32A and the first duct wall 42A. The element base 53 of the first seal element 26A, for example, is positioned radially outboard of the first case wall 32A such that the seal element surface 60 of the first seal element 26A is abutted against, (e.g., fully) contacts and/or otherwise sealingly engages the first case land surface 38A. Here, the first seal element 26A and its seal element surface 60 axially overlap and circumscribe the first case wall 32A and its first case land surface 38A. One or more or all of the element ribs 54 of the first seal element 26A are position radially inboard of the first duct wall 42A such that each respective element rib 54 of the first seal element 26A is abutted against, (e.g., fully) contacts and/or otherwise sealingly engages the first duct land surface 46A, for example, at or near its rib distal end 64. Here, the first seal element 26A and its element ribs 54 axially overlap and are circumscribed by the first duct wall 42A and its first duct land surface 46A.

Figure 3:
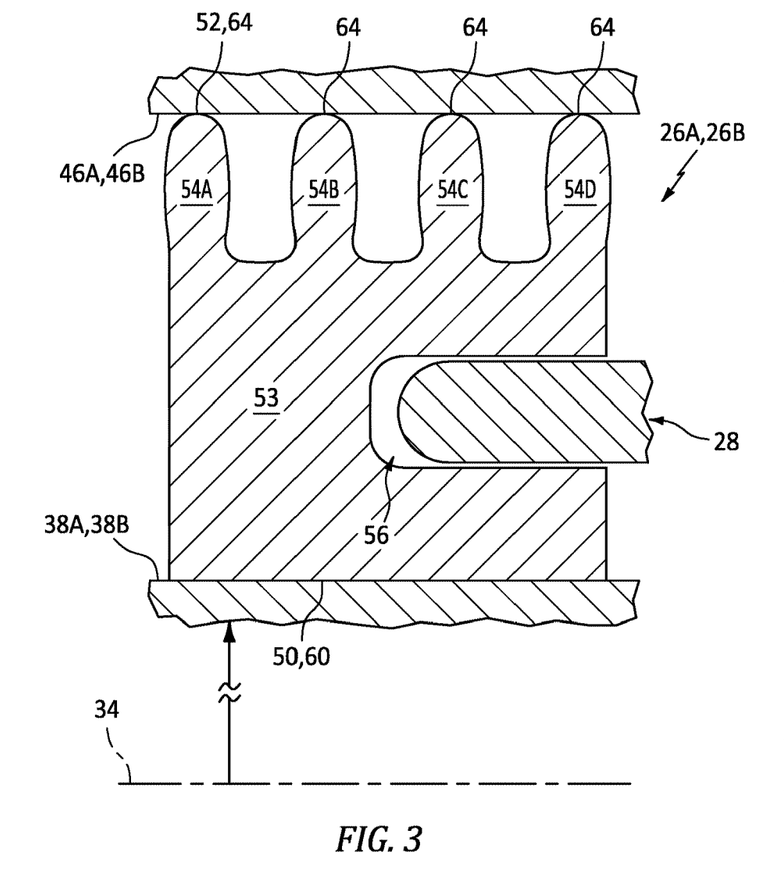
FIG. 3 is a partial sectional illustration of the inlet assembly with a respective seal element.

Following installation of the first seal element 26A, the first seal element 26A may be (e.g., slightly) radially compressed between the first case land surface 38A and the radially opposite first duct land surface 46A. This compression may cause one or more of the element ribs 54 to bend over as shown in FIG. 1. Referring to FIG. 3, the compression may also or alternatively radially compress one or more of the element ribs 54. This radial compression may cause one or more of the element ribs 54 to laterally bulge and/or otherwise laterally deform. Referring again to FIG. 1, the radially compressed first seal element 26A forms a radial seal between the first case wall 32A and the first duct wall 42A. This radial seal is also a compliant seal which may accommodate (e.g., slight) radial shifting between the first case wall 32A and the first duct wall 42A and/or (e.g., slight) axial shifting between the first case wall 32A and the first duct wall 42A.

During assembly of the second seal element 26B with the inlet case 22 and the inlet duct 24, the second seal element 26B is arranged between and is radially engaged with the second case wall 32B and the second duct wall 42B. The element base 53 of the second seal element 26B, for example, is positioned radially outboard of the second case wall 32B such that the seal element surface 60 of the second seal element 26B is abutted against, (e.g., fully) contacts and/or otherwise sealingly engages the second case land surface 38B. Here, the second seal element 26B and its seal element surface 60 axially overlap and circumscribe the second case wall 32B and its second case land surface 38B. One or more or all of the element ribs 54 of the second seal element 26B are position radially inboard of the second duct wall 42B such that each respective element rib 54 of the second seal element 26B is abutted against, (e.g., fully) contacts and/or otherwise sealingly engages the second duct land surface 46B, for example, at or near its rib distal end 64. Here, the second seal element 26B and its element ribs 54 axially overlap and are circumscribed by the second duct wall 42B and its second duct land surface 46B.

Following installation of the second seal element 26B, the second seal element 26B may be (e.g., slightly) radially compressed between the second case land surface 38B and the radially opposite second duct land surface 46B. This compression may cause one or more of the element ribs 54 to bend over as shown in FIG. 1. Referring to FIG. 3, the compression may also or alternatively radially compress one or more of the element ribs 54. This radial compression may cause one or more of the element ribs 54 to laterally bulge and/or otherwise laterally deform. Referring again to FIG. 1, the radially compressed second seal element 26B forms a radial seal between the second case wall 32B and the second duct wall 42B. This radial seal is also a compliant seal which may accommodate (e.g., slight) radial shifting between the second case wall 32B and the second duct wall 42B and/or (e.g., slight) axial shifting between the second case wall 32B and the second duct wall 42B.

The inlet screen 28 of FIG. 1 extends axially along the axis 34 between opposing axial ends 70A and 70B (generally referred to as "70") of the inlet screen 28. The inlet screen 28 extends circumferentially about (e.g., completely around) the axis 34 providing the inlet screen 28 with, for example, a full-hoop tubular geometry. The inlet screen 28 projects axially into the element groove 56 of the first seal element 26A at its first inlet screen axial end 70A. The inlet screen 28 projects axially into the element groove 56 of the second seal element 26B at its second inlet screen axial end 70B. With this arrangement, the inlet screen 28 may be retained in place between the first seal element 26A and the second seal element 26B. Moreover, the first seal element 26A may mount the inlet screen 28 with the first case wall 32A and the first duct wall 42A as well as provide a sealed interface between those inlet assembly members 28, 32A and 42A. The second seal element 26B may mount the inlet screen 28 with the second case wall 32B and the second duct wall 42B as well as provide a sealed interface between those seal assembly members 28, 32B and 42B.

Figure 4:
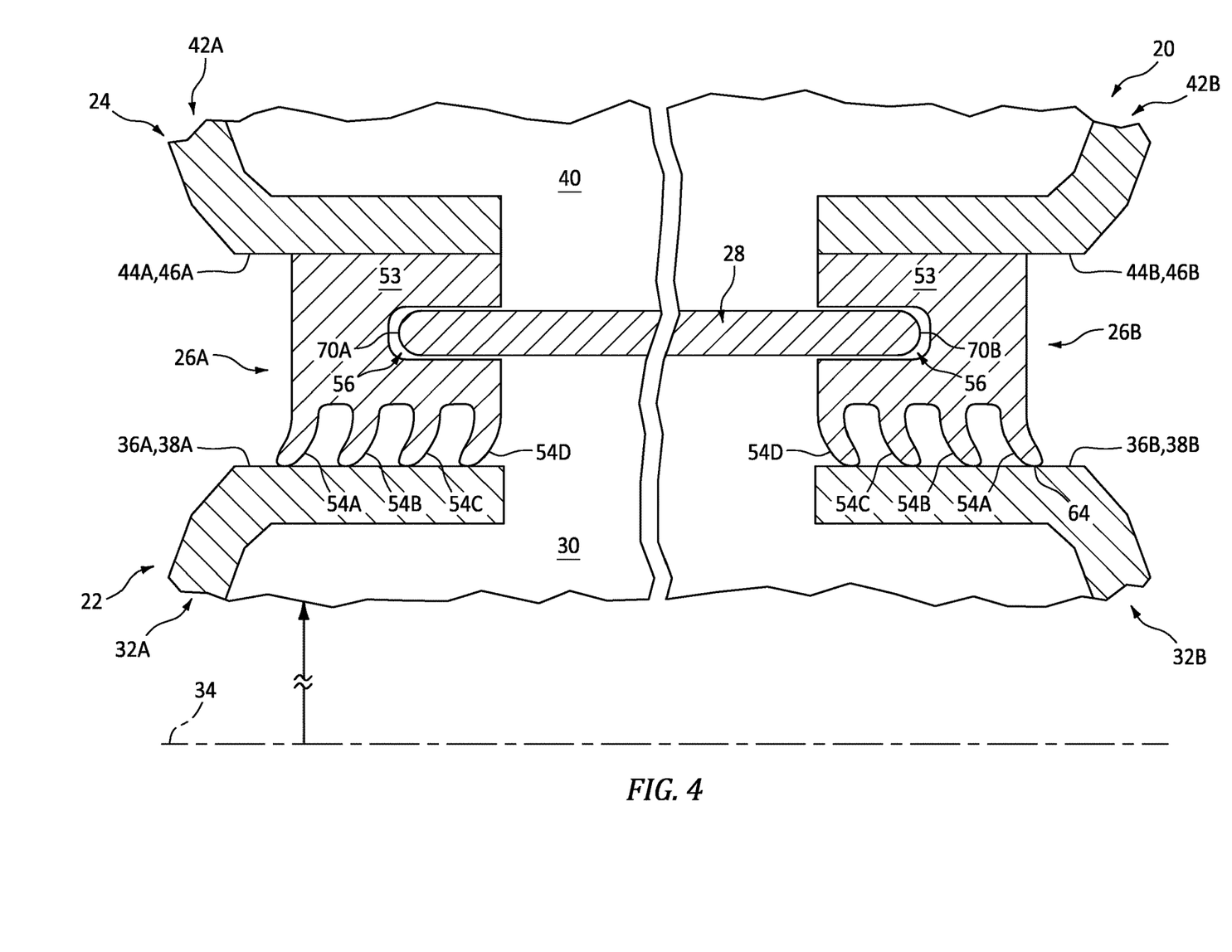
FIG. 4 is a partial sectional illustration of the inlet assembly with inverted seal elements.

While each seal element 26 of FIG. 1 is shown with its element ribs 54 facing and engaging the respective duct land surface 46, the present disclosure is not limited to such an exemplary arrangement. For example, referring to FIG. 4, an orientation of the first seal element 26A and/or the second seal element 26B may be reversed such that the element ribs 54 of the respective seal element 26 face and engage the respective case land surface 38.

For case of description, the installation of the first seal element 26A and the second seal element 26B are separately described above. It should be understood, however, the first and the second seal elements 26A and 26B may be adhered or otherwise bonded to the inlet screen 28 prior to installation. The first seal element 26A, the second seal element 26B and the inlet screen 28 may thereby be installed as a single component with the inlet case 22 and the inlet duct 24.

Figure 5:
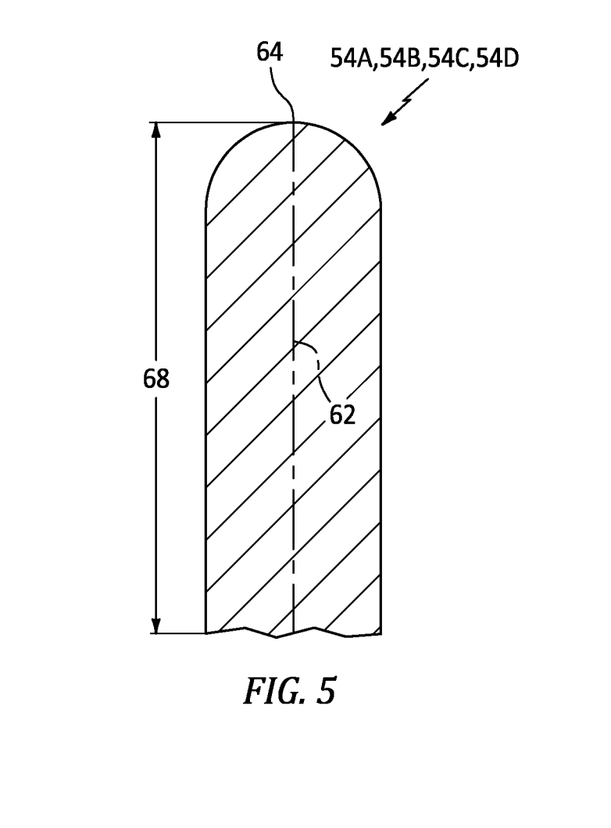
FIGS. 5 and 6 are partial sectional illustrations of a respective seal element rib with various configurations.
Figure 6:
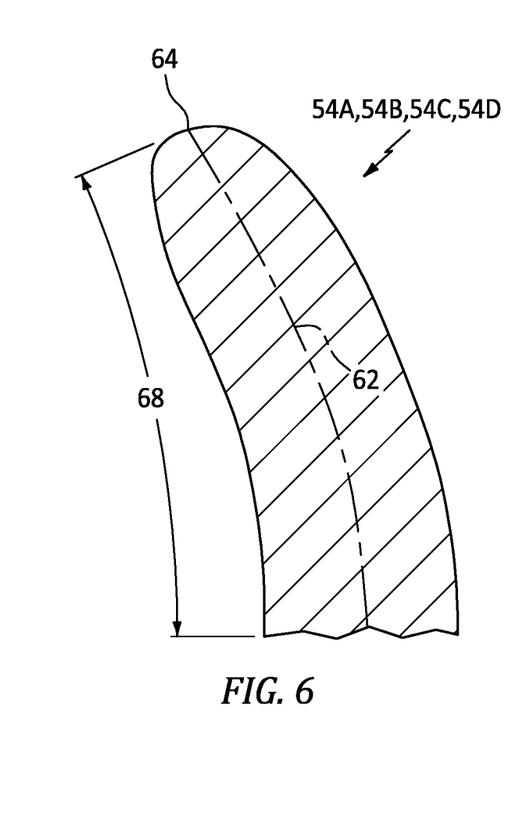

In some embodiments, referring to FIG. 5, the rib trajectory 62 of a respective element rib 54 may be straight along at least a portion or an entirety of the rib spanwise height 68 when viewed, for example, in a reference plane parallel with (e.g., including) the axis 34 (see FIG. 1). In other embodiments, referring to FIG. 6, the rib trajectory 62 of a respective element rib 54 may be non-straight (e.g., curved, splined, etc.) along at least a portion or the entirety of the rib spanwise height 68 when viewed, for example, in the reference plane. The respective element rib 54 may have one of the foregoing rib trajectories 62 of FIG. 5 or 6 prior to and/or following assembly of the respective seal element 26 with the other inlet assembly members 22, 24 and 28 (see FIG. 1).

Figure 7:
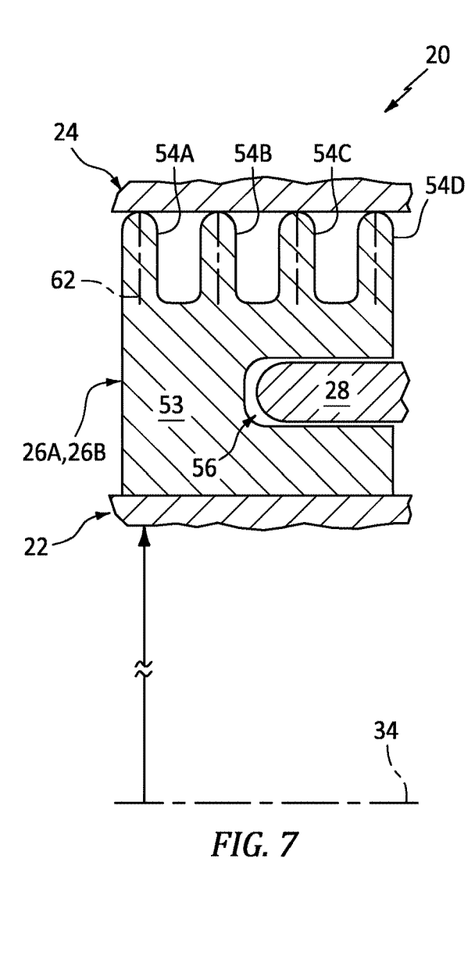
FIG. 7 is a partial sectional illustration of the inlet assembly including a respective seal element with perpendicular seal element ribs.
Figure 8A:
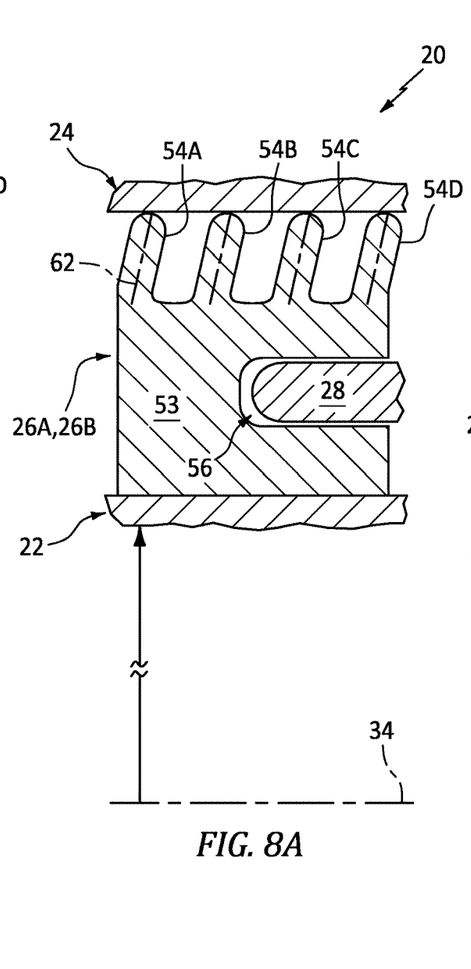
FIGS. 8A and 8B are partial sectional illustrations of the inlet assembly including a respective seal element with various canted seal element ribs.
Figure 8B:
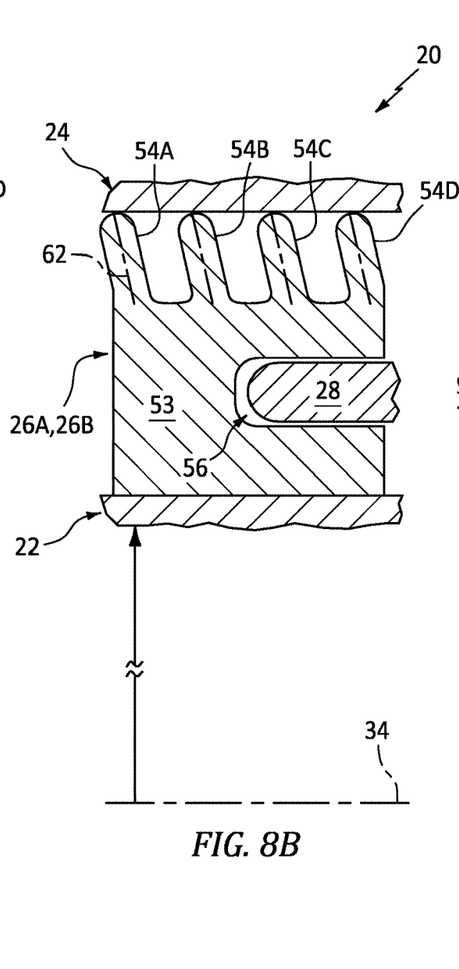

In some embodiments, referring to FIG. 7, the rib trajectory 62 of a respective element rib 54 may be perpendicular to the axis 34 along at least a portion or the entirety of the rib spanwise height 68 when viewed, for example, in the reference plane. In other embodiments, referring to FIGS. 8A and 8B, the rib trajectory 62 of a respective element rib 54 may be angularly offset from the axis 34 by an included angle (e.g., a non-zero acute angle) along at least a portion or the entirety of the rib spanwise height 68 when viewed, for example, in the reference plane. The respective element rib 54 and its rib trajectory 62 of FIG. 8A, for example, may be canted in an axial direction towards the element groove 56 and, thus, the inlet screen 28. In another example, the respective element rib 54 and its rib trajectory 62 of FIG. 8B may be canted in an axial direction away from the element groove 56 and, thus, the inlet screen 28. In general, the element ribs 54 and their trajectories 62 may be canted in a direction towards a higher pressure volume. The respective element rib 54 may have one of the foregoing arrangements of FIG. 7, 8A or 8B prior to and/or following assembly of the respective seal element 26 with the other inlet assembly members 22, 24 and 28 (see FIG. 1).

Figure 9A:
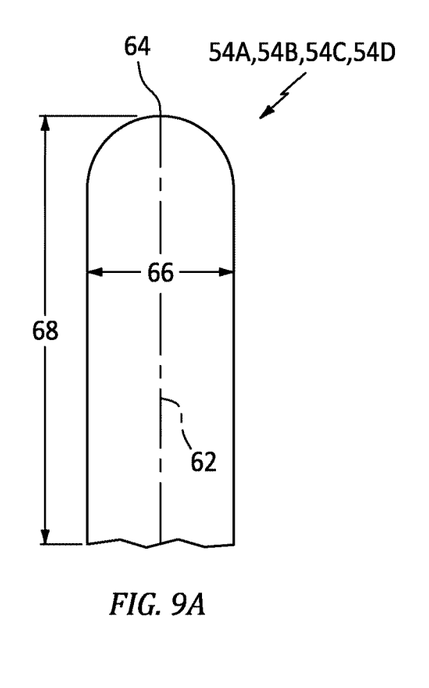
FIGS. 9A-C are partial sectional illustrations of a respective seal element rib with various sectional geometries.
Figure 9B:
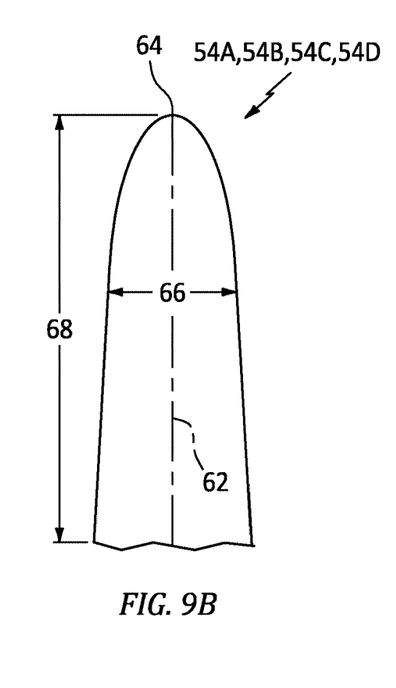
Figure 9C:
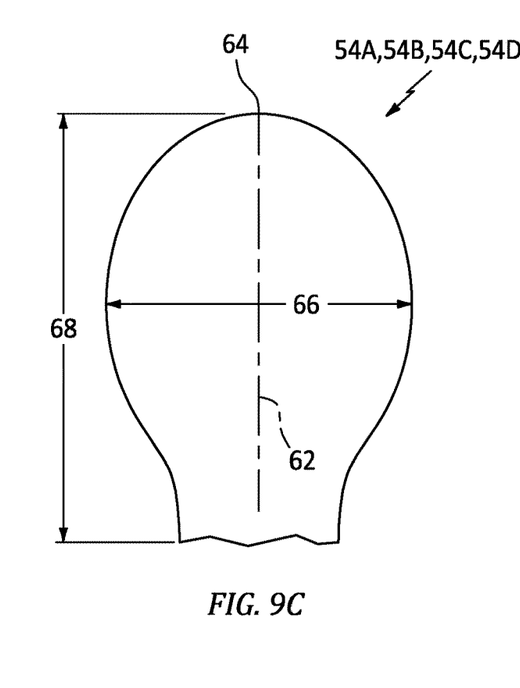

In some embodiments, referring to FIG. 9A, the rib lateral width 66 of a respective element rib 54 may be uniform along at least a majority (e.g., more than 50%) or the entirety of the rib spanwise height 68 when viewed, for example, in the reference plane. The rib lateral width 66 of the element rib 54 of FIG. 9A, for example, is uniform along at least 80% or 90% of its rib spanwise height 68. In other embodiments, referring to FIGS. 9B and 9C, the rib lateral width 66 of a respective element rib 54 may change (e.g., decrease, fluctuate, etc.) along at least a portion or the entirety of the rib spanwise height 68 when viewed, for example, in the reference plane. The rib lateral width 66 of the element rib 54 of FIG. 9B, for example, (e.g., continuously or incrementally) decreases as that element rib 54 projects out from the element base 53 (see FIG. 2) to its rib distal end 64. The element rib 54 of FIG. 9B thereby has a laterally tapered sectional geometry. In another example, the rib lateral width 66 of the element rib 54 of FIG. 9C (e.g., continuously or incrementally) increases and then decreases as that element rib 54 projects out from the element base 53 (see FIG. 2) to its rib distal end 64. The element rib 54 of FIG. 9C may thereby have a bulbous (or other) sectional geometry.

Figure 10:
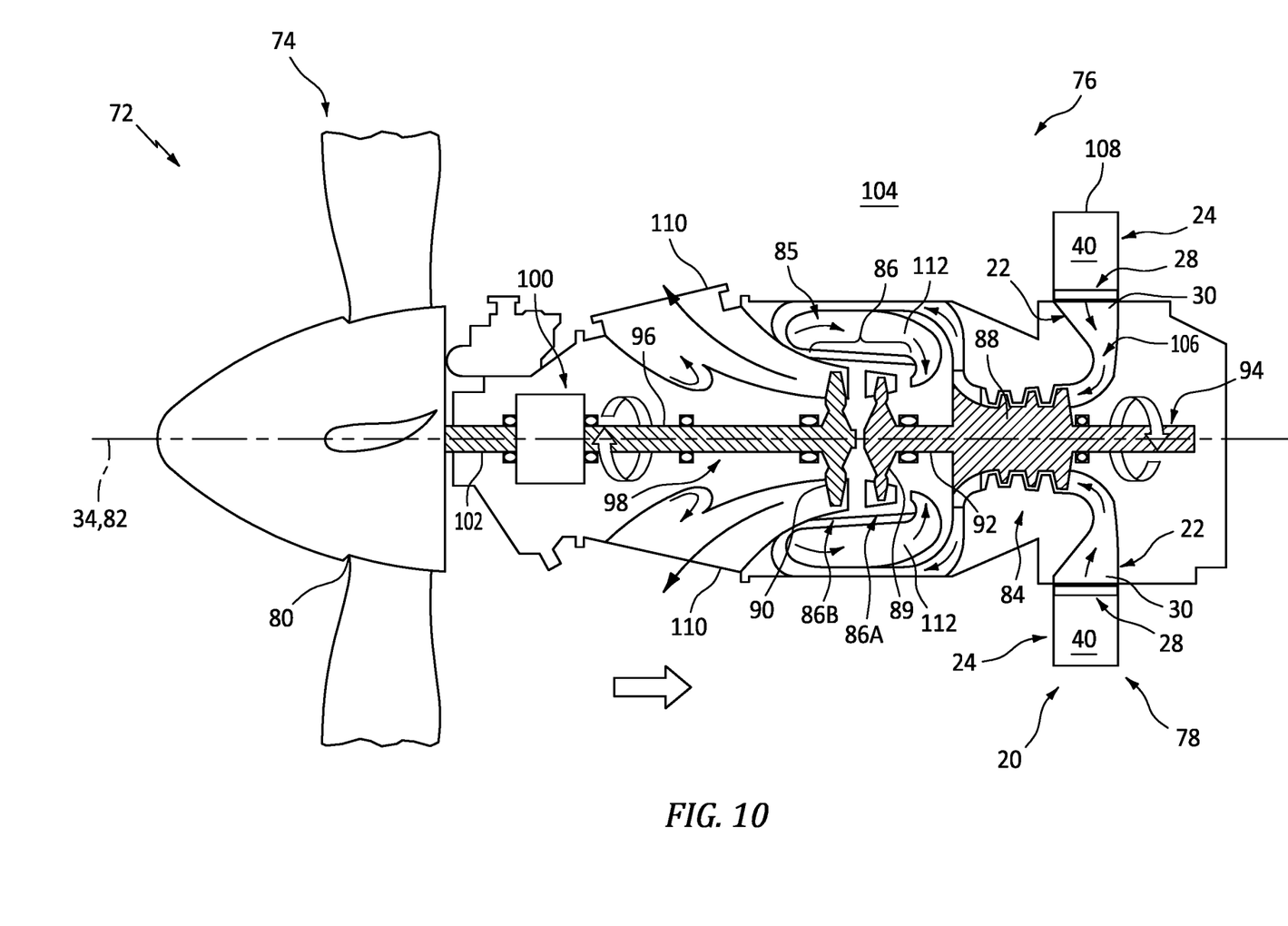
FIG. 10 is a sectional schematic illustration of an aircraft system configured with the inlet assembly.

FIG. 10 illustrates an exemplary aircraft system 72 with which the inlet assembly 20 may be included. The aircraft system 72 of FIG. 10 includes a mechanical load 74, a gas turbine engine 76 and an inlet structure 78. Here, the gas turbine engine 76 includes the inlet case 22, and the inlet structure 78 includes the inlet duct 24, the seal elements 26 (see FIG. 1) and the inlet screen 28.

The mechanical load 74 includes at least (or only) one rotor 80 operable to be rotatably driven by the gas turbine engine 76. This mechanical load 74 may be configured as a propulsor for propelling the aircraft during flight. The driven rotor 80, for example, may be a bladed propulsor rotor. An example of the propulsor rotor is a propeller rotor where the gas turbine engine 76 is a turboprop gas turbine engine. Another example of the propulsor rotor is a helicopter rotor (e.g., a main rotor) where the gas turbine engine 76 is a turboshaft gas turbine engine. The mechanical load 74, however, may alternatively be configured as an electrical power generator. The driven rotor 80, for example, may be a generator rotor where the gas turbine engine 76 is an auxiliary power unit (APU). The present disclosure, however, is not limited to the foregoing exemplary driven rotor types nor the foregoing exemplary gas turbine engine types.

The gas turbine engine 76 of FIG. 10 extends axially along an axial centerline 82; e.g., the axis 34. The gas turbine engine 76 of FIG. 10 includes a compressor section 84, a combustor section 85 and a turbine section 86. The turbine section 86 of FIG. 10 includes a high pressure turbine (HPT) section 86A and a low pressure turbine (LPT) section 86B, which LPT section 86B may also be referred to as a power turbine (PT) section and/or a free turbine section.

The compressor section 84 includes a bladed compressor rotor 88. The HPT section 86A includes a bladed high pressure turbine (HPT) rotor 89. The LPT section 86B includes a bladed low pressure turbine (LPT) rotor 90, which LPT rotor 90 may also be referred to as a power turbine (PT) rotor and/or a free turbine rotor. Each of these bladed engine rotors 88-90 includes one or more arrays of rotor blades (e.g., airfoils, vanes, etc.), where each rotor blade array is arranged circumferentially around and connected to a respective rotor base; e.g., a disk or a hub.

The compressor rotor 88 is connected to the HPT rotor 89 through a high speed shaft 92. At least (or only) the compressor rotor 88, the HPT rotor 89 and the high speed shaft 92 may collectively form or may otherwise be a part of a high speed rotating assembly 94; e.g., a high speed spool. The LPT rotor 90 is connected to a low speed shaft 96. At least (or only) the LPT rotor 90 and the low speed shaft 96 may collectively form or may otherwise be a part of a low speed rotating assembly 98. This low speed rotating assembly 98 of FIG. 10 is coupled to the driven rotor 80 through a geartrain 100 (e.g., an epicyclic geartrain) and a propulsor shaft 102. However, in other embodiments, the driven rotor 80 may be part of the low speed rotating assembly 98 where, for example, the low speed shaft 96 connects the LPT rotor 90 to the driven rotor 80 without the geartrain 100.

The inlet structure 78 is configured to direct air into the gas turbine engine 76 from an environment 104 external to the aircraft system 72 and, more generally, external to the aircraft. This inlet structure 78 may be configured as a standalone structure. Alternatively, the inlet structure 78 may be configured as a part of a housing structure for the gas turbine engine 76 and/or one or more other components of the aircraft.

During gas turbine engine operation, (e.g., fresh, ambient) air from the external environment 104 enters a flowpath 106 of the aircraft system 72 and its gas turbine engine 76 through an airflow inlet 108 into the inlet structure 78. This flowpath 106 extends longitudinally in the aircraft system 72 from the inlet port 30 to a combustion products exhaust 110 from the gas turbine engine 76. An upstream portion of the flowpath 106 is formed within and extends longitudinally through the inlet structure 78. The flowpath 106 of FIG. 10, for example, extends radially inward towards the axial centerline 82 from the airflow inlet 108 to the inlet port 30. A downstream portion of the flowpath 106 is formed within and extends longitudinally through the gas turbine engine 76. The flowpath 106 of FIG. 10, for example, projects radially inward towards the axial centerline 82 into the gas turbine engine 76 from the inlet port 30. The flowpath 106 subsequently extends sequentially through the compressor section 84, the combustor section 85, the HPT section 86A and the LPT section 86B to the engine exhaust 110.

The flowpath 106 directs the air longitudinally (e.g., in a radial inward direction towards the axial centerline 82) through the inlet duct 24 and the inlet port 30 into the gas turbine engine 76. Within the gas turbine engine 76, the air is compressed by the compressor rotor 88 and directed into a (e.g., annular) combustion chamber 112 of a (e.g., annular) combustor in the combustor section 85. Fuel is injected into the combustion chamber 112 and mixed with the compressed air to provide a fuel-air mixture. This fuel-air mixture is ignited and combustion products thereof flow through and sequentially cause the HPT rotor 89 and the LPT rotor 90 to rotate before being exhausted from the gas turbine engine 76 through the engine exhaust 110 into the external environment 104. The rotation of the HPT rotor 89 drives rotation of the compressor rotor 88 and, thus, compression of the air received through the inlet duct 24 and the inlet port 30. The rotation of the LPT rotor 90 drives rotation of the driven rotor 80. Where the driven rotor 80 is a propulsor rotor such as the propeller rotor shown in FIG. 10, the rotation of the driven rotor 80 propels air outside of the gas turbine engine 76 in an aft direction along the axial centerline 82 to provide forward aircraft flight. Where the driven rotor 80 is the generator rotor, the rotation of the driven rotor 80 drives the electrical power generator to generate electrical power.

For ease of description, the inlet assembly 20 is described above with respect to the aircraft powerplant being a gas turbine engine. It is contemplated, however, the aircraft powerplant may alternatively be configured as or otherwise include another type of heat engine (e.g., a rotary engine such as a Wankel engine), a hybrid-electric powerplant and/or an electric motor. Moreover, while the assembly is described above as the inlet assembly 20, it is contemplated the one or more seal elements 26A and/or 26B may alternatively form a sealed interface between various aircraft powerplant components other than the inlet assembly members 22, 24 and 28. For example, the one or more seal elements 26A and/or 26B may alternatively be arranged to mount a baffle, a wall, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
   a first component comprising a first land surface, the first land surface extending axially along and circumferentially about an axis;
   a second component comprising a second land surface radially opposite the first land surface, the second land surface extending axially along and circumferentially about the axis;
   an annular seal element comprising a polymer material, the annular seal element extending radially between a first side and a second side, the annular seal element including a base, a plurality of ribs and a groove, the base comprising a seal element surface disposed at the first side that radially engages the first land surface, the plurality of ribs disposed at the second side, each of the plurality of ribs projecting out from the base and radially engaging the second land surface, and the groove projecting partially axially into the base; and
   a third component projecting axially into the groove.

2. The assembly of claim 1, wherein the third component is mounted with the first component and the second component through the annular seal element.

3. The assembly of claim 1, wherein
   the annular seal element extends circumferentially about the axis; and
   the third component extends circumferentially about the axis.

4. The assembly of claim 1, further comprising:
   a second annular seal element including a second base, a plurality of second ribs and a second groove;
   the second base comprising a second seal element surface that radially engages another first land surface of the first component;
   each of the plurality of second ribs projecting out from the second base and radially engaging another second land surface of the second component;
   the second groove projecting partially axially into the second base; and
   the third component projecting axially into the second groove.

5. The assembly of claim 1, wherein the third component comprises an inlet screen for the aircraft powerplant.

6. The assembly of claim 1, wherein the first land surface circumscribes the second land surface.

7. The assembly of claim 1, wherein the second land surface circumscribes the first land surface.

8. The assembly of claim 1, wherein the first land surface has a cylindrical geometry at least where the seal element surface radially engages the first land surface.

9. The assembly of claim 1, wherein the second land surface has a cylindrical geometry at least where the plurality of ribs radially engage the second land surface.

10. The assembly of claim 1, wherein each of the plurality of ribs is an annular rib.

11. The assembly of claim 1, wherein
    the plurality of ribs comprises a first rib;
    the first rib projects out from the base along a trajectory to a distal end of the first rib; and
    the trajectory is perpendicular to the axis at least prior to radial engagement with the second land surface.

12. The assembly of claim 1, wherein
    the plurality of ribs comprises a first rib;
    the first rib projects out from the base along a trajectory to a distal end of the first rib; and
    the trajectory is angularly offset from the axis by an acute angle towards the groove.

13. The assembly of claim 1, wherein
    the plurality of ribs comprises a first rib;
    the first rib projects out from the base along a trajectory to a distal end of the first rib; and
    the trajectory is angularly offset from the axis by an acute angle away from the groove.

14. The assembly of claim 1, wherein
    the plurality of ribs comprises a first rib;
    the first rib projects out from the base along a trajectory to a distal end of the first rib; and
    the trajectory is a straight line trajectory at least prior to radial engagement with the second land surface.

15. The assembly of claim 1, wherein
    the plurality of ribs comprises a first rib;
    the first rib projects out from the base along a trajectory to a distal end of the first rib; and
    the trajectory is a non-straight line trajectory at least prior to radial engagement with the second land surface.

16. The assembly of claim 1, wherein
    the plurality of ribs comprises a first rib;
    the first rib projects out from the base along a trajectory to a distal end of the first rib; and
    the first rib has a lateral width that is constant along a majority of the trajectory between the base and the distal end.

17. The assembly of claim 1, wherein
    the plurality of ribs comprises a first rib;
    the first rib has a lateral width that decreases as the first rib projects out from the base to a distal end of the first rib.

18. The assembly of claim 1, wherein the plurality of ribs comprises a first rib with a bulbous sectional geometry.

19. An assembly for an aircraft powerplant, comprising:

an inlet case comprising an inlet case wall with a case land surface;

an inlet duct circumscribing the inlet case, the inlet duct comprising an inlet duct wall with a duct land surface;

a polymer seal element arranged radially between the case land surface and the duct land surface, the polymer seal element including a base and a plurality of ribs, the base sealingly engaging the case land surface, and each of the plurality of ribs projecting out from the base and sealing engaging the duct land surface; and an inlet screen mounted with the inlet case and the inlet duct through the polymer seal element.

20. An assembly for an aircraft powerplant, comprising:

an inlet case comprising an inlet case wall with a case land surface;

an inlet duct circumscribing the inlet case, the inlet duct comprising an inlet duct wall with a duct land surface radially opposite the case land surface;

a compliant seal element arranged radially between the case land surface and the duct land surface, the compliant seal element including a cylindrical surface, a plurality of ribs and a groove, the cylindrical surface sealingly engaging the case land surface, each of the plurality of ribs sealingly engaging the duct land surface; and an inlet screen projecting into the groove, the compliant seal element forming a seal between the inlet case wall, the inlet duct wall and the inlet screen.

* * * * *